US009183397B2

(12) United States Patent
Futoransky et al.

(10) Patent No.: US 9,183,397 B2
(45) Date of Patent: Nov. 10, 2015

(54) SYSTEM AND METHOD FOR PROVIDING AUTOMATED COMPUTER SECURITY COMPROMISE AS A SERVICE

(75) Inventors: Ariel Futoransky, Buenos Aires (AR); Aureliano Emanuel Calvo, Buenos Aires (AR); Fernando Russ Federico Russ, Buenos Aires (AR); Jorge Lucangeli Obes, San Francisco, CA (US); Ariel Waissbein, Buenos Aires (AR); Alejandro Javier Frydman, Buenos Aires (AR); Ezequiel David Gutesman, Buenos Aires (AR); Pedro Oscar Varangot, Buenos Aires (AR)

(73) Assignee: Core SDI Incorporated, Buenos Aires (AR)

( * ) Notice: Subject to any disclaimer, the term of this patent is extended or adjusted under 35 U.S.C. 154(b) by 0 days.

(21) Appl. No.: 14/123,647

(22) PCT Filed: Jun. 5, 2012

(86) PCT No.: PCT/US2012/040911
§ 371 (c)(1),
(2), (4) Date: Apr. 2, 2014

(87) PCT Pub. No.: WO2013/170423
PCT Pub. Date: Dec. 13, 2012

(65) Prior Publication Data
US 2014/0237606 A1 Aug. 21, 2014

Related U.S. Application Data

(60) Provisional application No. 61/493,477, filed on Jun. 5, 2011.

(51) Int. Cl.
G06F 21/57 (2013.01)
H04L 29/06 (2006.01)
(Continued)

(52) U.S. Cl.
CPC ............ G06F 21/577 (2013.01); G06F 21/552 (2013.01); H04L 63/1433 (2013.01); H04L 67/025 (2013.01)

(58) Field of Classification Search
CPC ..... G06F 21/577; G06F 21/57; G06F 21/552; H04L 63/1433; H04L 67/025
See application file for complete search history.

(56) References Cited

U.S. PATENT DOCUMENTS

2001/0034847 A1  10/2001  Gaul, Jr.
2003/0195861 A1*  10/2003  McClure et al. .................. 707/1
(Continued)

FOREIGN PATENT DOCUMENTS

WO  2008142710 A2  11/2008

OTHER PUBLICATIONS

Hamisi et al., Intrussion detection by penetration test in an organization network, Jan. 2009, 2nd International Conference on Adaptive Science & Technology, 2009, pp. 226-231.*
(Continued)

*Primary Examiner* — Kenneth Chang
(74) *Attorney, Agent, or Firm* — Peter A. Nieves; Sheehan Phinney Bass + Green PA

(57) ABSTRACT

A system for providing automated computer security compromise as a service, contains a web server having a web front end running on the web server. The Web server has stored therein pentest definitions. A command and control component processes the pentest definitions, builds pentest task tickets and reporting task tickets, and monitors at least one penetration tester component and/or at least one report generator component. The command and control component interacts with a cloud computing environment to scale up or down the number of penetration tester components and the number of report generator components, and assigns task tickets to the penetration tester and report generator components. At least one penetration tester component runs penetration testing modules available inside the penetration testing framework as instructed by the pentest task tickets. At least one reporter generator component generates reports based on the reporting tasks tickets generated by the command and control service.

17 Claims, 14 Drawing Sheets

(51) Int. Cl.
*G06F 21/55* (2013.01)
*H04L 29/08* (2006.01)

(56) References Cited

U.S. PATENT DOCUMENTS

| | | | | |
|---|---|---|---|---|
| 2003/0212779 | A1* | 11/2003 | Boyter et al. | 709/223 |
| 2003/0217039 | A1* | 11/2003 | Kurtz et al. | 707/1 |
| 2007/0171834 | A1* | 7/2007 | Sathyanarayana et al. | 370/241 |
| 2007/0204347 | A1 | 8/2007 | Caceres et al. | |
| 2008/0092237 | A1* | 4/2008 | Yoon et al. | 726/25 |
| 2009/0007270 | A1* | 1/2009 | Futoransky et al. | 726/25 |
| 2011/0035803 | A1 | 2/2011 | Lucangeli Obes et al. | |
| 2011/0061104 | A1 | 3/2011 | Sarraute Yamada et al. | |
| 2012/0174228 | A1* | 7/2012 | Giakouminakis et al. | 726/25 |
| 2012/0185944 | A1* | 7/2012 | Abdine et al. | 726/25 |

OTHER PUBLICATIONS

Samant. "Automated Penetration Testing"; [online]; Department of Computer Science San Jose State University; Published May 28, 2011; retrieved from the Internet http://www.cs.sjsu.edu/faculty/stamp/students/samant_neha/pdf.

Extended European Search Report; EP 12796768, dated Mar. 23, 2015.

* cited by examiner

FIG. 10

SYSTEM AND METHOD FOR PROVIDING AUTOMATED COMPUTER SECURITY COMPROMISE AS A SERVICE

FIELD OF THE INVENTION

The present invention relates generally to computer security, and particularly to building an efficient service for analyzing the security of a computer system and analyzing application security by compromising the security in a systematic manner via use of software or an infrastructure that is deployed in a cloud infrastructure.

BACKGROUND OF THE INVENTION

Computer systems that are connected to a computer network, such as the Internet, and host services, and which run applications are inherently insecure and face threats of varying risk. In order to design and implement the necessary security measures so that the risks underlying deployments on or within computing infrastructures are eliminated or mitigated, it is necessary to constantly monitor these networks, detect threats, be able to assess the risk they impose and prepare the necessary countermeasures.

The effectiveness of the security measures of a computer system may be evaluated by performing a computer security audit in which various aspects of computer security are analyzed and evaluated. The security audit may include a penetration test, which is a process by which a security auditor attempts to gain unauthorized access to an infrastructure of a computer system network, applications, and users mimicking what an attacker does. The target of a penetration test can be all of these "attack vectors" or any subset, such as the web applications, the network devices, the client applications and its users, wireless communications, or other vectors.

In general, a penetration test is a service offered by skilled auditors that use security tools in combination with a multitude of ad hoc methods and tools, in order to mimic an attacker and gain unauthorized (i.e., not included in the implicit or explicit security policy) control of valuable assets in the target network. For example, an auditor will conduct the test from his computer that is placed outside of the network perimeter (e.g., anywhere in the Internet) and attempt to take control of the desktops inside the target network, and possibly pivot to access corporate file repositories. Alternatively, the auditor may sit in one of the different network segments inside the perimeter (e.g., in the same network where developers sit) and attempt to access the valuable information (e.g., the credit cards database—which should be of restricted access for the deployment to be compliant with the Payment Card Industry Data Security Standard (PCI DSS)—or the individual health data—which should be of restricted access for the deployment to be compliant with Health Insurance Portability and Accountability Act (HIPAA)).

Computing infrastructure deployments evolve, as new software is added or old software is updated, new hosts are added or removed, the network topology is changed, vulnerabilities are introduced and made public; the security posture of an organization varies. It is therefore common, to test the security of the network periodically. For example the PCI DSS compliance standard mandates that there is at least one penetration test a year and also whenever there is a significant change in the network.

On the other hand, security tests have been typically deemed costly and time-demanding. Nowadays, there is a trend on moving computing infrastructures into "the cloud" which in particular implies an outsourcing of IT resources. However, there is still no consensus in how to approach the security on these new infrastructures. As an example, the Federal Risk and Authorization Management Program (FedRAMP) has only recently started debating this.

Cloud Services

Cloud computing is an informal term that encompasses different computing architectures that allow the scaling of computer resources that are accessed remotely. An "infrastructure as a service" platform provides its users with the ability to dynamically and programmatically administer the computing resources in their infrastructure (and also the associated costs). The granularity of resources to administer is at the infrastructure level (e.g., machine instances, network traffic, routers, load balancers). In a "Platform as a Service" offering a solution stack is provided including an installed OS, programming platform, database, etc.

Cloud services use virtualization and other technologies that are not new. However, they are implemented and deployed in non-standard ways. For example, Amazon Web Services from Amazon, GoogleAppEngine from Google, Azure from Microsoft, Rackspace, GoGrid, and Flexiscale all have different offerings. Moreover, users of these approach the design and deployment of their infrastructures differently even within the same specific cloud vendor.

Amazon Web Services (AWS) is one of the biggest competitors in the Platform as a Service space. One of its products, Amazon Elastic Compute Cloud (Amazon EC2) "is a web service that provides resizable compute capacity in the cloud. It is designed to make web-scale computing easier for developers."

These new technologies, or actually the novel use and assembly of technologies that have come to be known as "cloud computing," present several (new) problems to assess the security posture of a cloud infrastructure.

Limitations of Penetration Testing and its Automation

There are several aspects and features of the penetration testing frameworks and tools that facilitate the rendered services or help to maximize the coverage of threats that can be discovered. For example:

a first aspect worth mentioning is related to the threat coverage, specifically the attack vectors that a penetration testing framework (or any set of security tools) covers: the more attack vectors it covers and combines the broader spectrum of threats the framework may detect and exercise. A small handful of multiple attack-vector penetration testing frameworks are available—and most of these are commercial tools with the exception of a single open-source tool. Several single attack-vector tools or penetration testing frameworks have been designed and are available as commercial or open-source tools. For example, the so-called "web-application attack vector" can be tested by several of these, including Nikto, Paros, WebScarab and Burpsuite. These tools can handle some of the security tests relevant to the web-application attack vector, but rarely allow for local information gathering that will allow the auditor to assess the underlying risk of the network vulnerabilities. Moreover, since the auditor cannot test other vectors (e.g., network attack vector), pivoting is out of the question for him. In this sense, the coverage of single-vector penetration-testing tools underlying penetration tests is limited.

Similarly, the coverage of a penetration test is affected by the so-called depth in which each attack vector is covered during the test. Explicitly, a security tool is only able to target a subset of all the vulnerabilities present in an attack vector; and when this portion is small (the tool does not delve deep into the attack vector), then coverage is impacted negatively.

A second aspect worth mentioning is in the expertise of the auditor executing the penetration test or the way in which this expertise is embedded in the automation of these Frameworks—starting from automating common and/or repetitive chores (e.g., testing the Internet-facing web applications) through scripts, to the complete automation of a penetration test. Some of the available tools handle some rudimentary scripting automation, but one or two handle what is known in the art as attack planning capabilities; namely, the ability to accept as input an objective a potential threat that an attacker could exercise (e.g., compromise this server).

A third relevant aspect is that of mobility. The penetration tests are executed by a penetration tester or auditor running these tools from a computing device—such as laptop computer. In order to mimic the different attacker profiles—for example, insider and external hacker—the auditor must place his computer (i.e., the computer that runs this software) at different spots in the network topology. Alternatively, he may install a software agent in a system or device that lies in this network segment. That is, there is a mobility requirement which is typically addressed by moving a laptop with the installed software from place to place—and later integrating the results—or by running the tests from different computers.

A fourth aspect is that related to the form factor in which these functionalities are provided. In order to run these tools or frameworks, the user has to acquire (e.g., buy and/or download) the tool, install it and configure it for his computer. If this auditor requires a functionality that is not present in the tool or framework he uses, he must then install a second tool or framework to do so. Further, if this tool is commercial, he must first buy the tool. Note that when deciding for this second tool, the penetration tester must take into account the three aspects discussed before. In any case, a new investment of resources (monetary or other) must be made. It may be the case that the return of investment from buying a new commercial tool, or even installing a free one, is prohibitive for a smaller IT or security department in an organization. In this case, the security department has to conform by choosing from a restrictive set of less powerful tools.

Moreover, cloud infrastructures themselves introduce new elements and therefore a network infrastructure that is deployed in a cloud computing infrastructure is liable to new kinds of vulnerabilities that cannot be exercised with the older tools and techniques, but require tools and expertise to specifically target this.

In view of the shortcomings discussed above, there is a need for a system and method for automated computer security compromise delivered as a service.

SUMMARY OF THE INVENTION

Embodiments of the present invention provide a system and method providing automated computer security compromise as a service, running within a cloud computing environment, the system comprising: a web server having a web front end running on the web server, wherein users connect to the Web server via the Web front end, and wherein the Web server has stored therein pentest definitions created by the users through use of the Web front end; a command and control component which processes the pentest definitions, builds pentest task tickets and reporting task tickets, and monitors different portions of the system, wherein the portions of the system are selected from the group consisting of at least one penetration tester component and at least one report generator component, wherein the command and control component interacts with the cloud computing environment to scale up or down the number of penetration tester components and the number of report generator components, and assigns the task tickets to the penetration tester components and to the report generator components, at least one penetration tester component runs a penetration testing framework, the penetration testing component being able to run penetration testing modules available inside the penetration testing framework as instructed by the pentest task tickets built by the command and control component; at least one reporter generator component generates reports based on the reporting tasks tickets generated by the command and control service; and a central database for storing pentest results wherein results are isolated by the central database for each front end user.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 10 is a screenshot illustrating part of the web front end dashboard.

DETAILED DESCRIPTION

Figure 1:
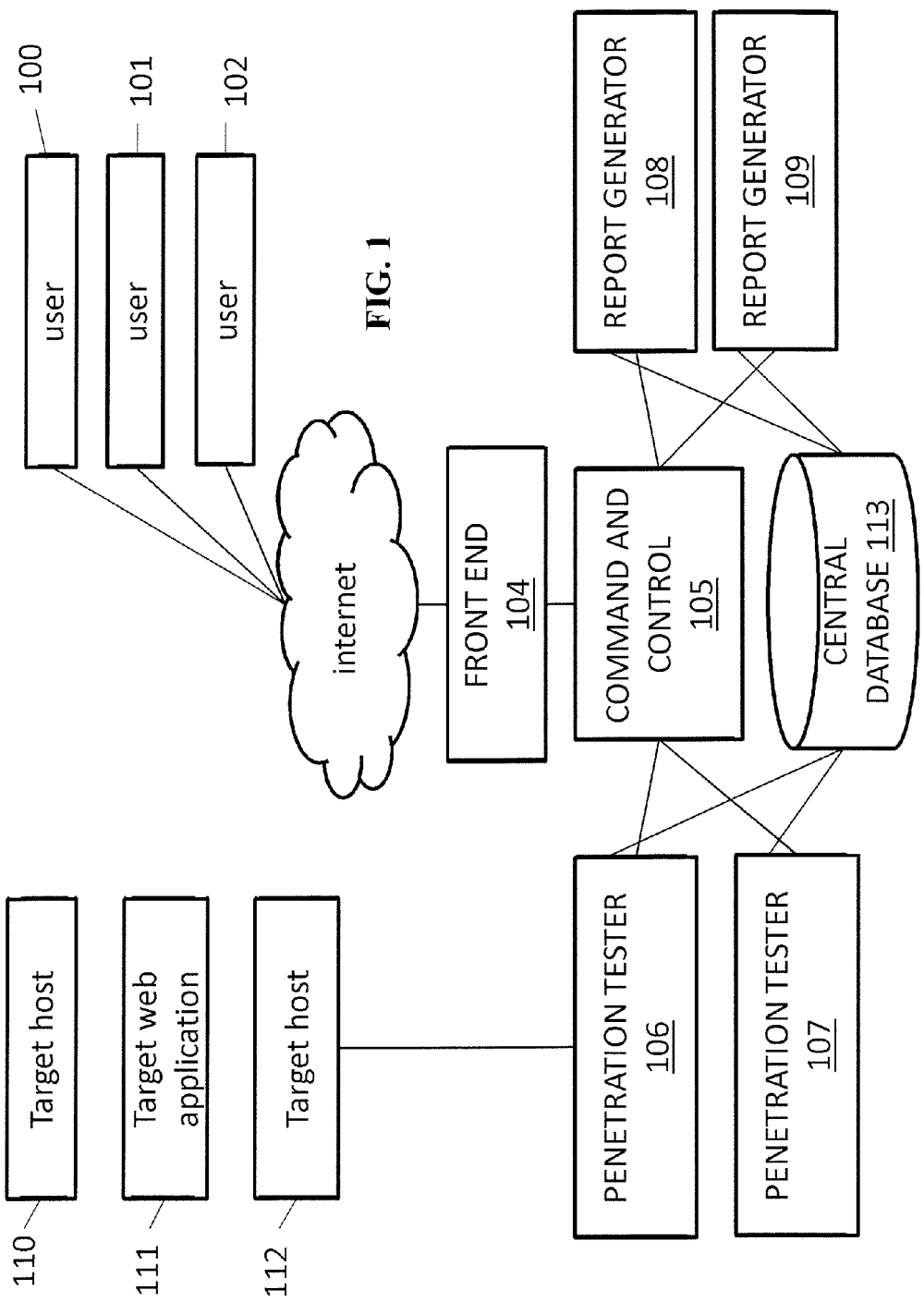
FIG. 1 is as schematic illustrating the present system for providing automated computer security compromise as a service.

A typical penetration test or pentest includes the following stages:

1. Information gathering: The security auditor gathers technical details about the target system and information regarding the users of the target computer network infrastructure, including but not limited to, the hosts in this network and a set of web-applications belonging to the target system.

2. Information analysis and planning: The auditor analyzes the information to plan an overall approach by which to perform the penetration testing. He may then continue going back to the Information Gathering stage, or moving to Vulnerability Detection.

3. Vulnerability Detection and Compromise of the Target Systems: The auditor searches the target computer network infrastructure for security vulnerabilities based on the top-level plan developed in the information analysis and planning stage. Security vulnerabilities include, for example, system misconfigurations that enable an unauthorized user to gain access to resources in the target, remotely-exploitable vulnerabilities in the server-side software that runs in them, vulnerabilities in client-side applications, cryptographic vulnerabilities in wireless communication channels, and injection vulnerabilities in web applications. (See, for example, "The Shellcoder's Handbook: Discovering and Exploiting Security Holes," by Chris Anley, John Heasman, Felix Lindner, Gerardo Richarte; Wiley; 2 edition (Aug. 20, 2007).)

The auditor attempts to compromise the target systems, applications or devices based on the available information using a combination of commercial, publicly available and custom-developed programs. These programs include code modules that can exploit the vulnerabilities and provide the user with new/additional privileges.

4. Local Information Gathering and Privilege Escalation/Pivoting: After one or more computer systems or applications have been compromised, the auditor has probably gained access to new systems or privileges, depending on the network topology and permissions he has access to. He will then assess the security-relevance of the new assets he can access. Moreover, he may opt to restart the process by the Information Gathering stage now using the newly acquired privileges—e.g., and follow that by pivoting to other computers or devices in the network—or continue with Analysis and Reporting.

5. Analysis and Reporting: This stage includes consolidating and presenting the information obtained during the previous stages and developing recommendations for remedying the security vulnerabilities identified during the penetration test.

6. Clean up: The compromising and accessing stage typically results in significant changes being made to the target systems, applications or devices. In the clean up stage, the auditor returns the system to its original configuration. To perform a successful clean up, a detailed and exact list of all actions performed during testing must be maintained, yet there are only rudimentary tools available for maintaining such information.

During 2001, the first penetration testing framework was developed (CORE IMPACT; e.g., USPTO U.S. Pat. Nos. 7,228,566 and 7,757,293) and shortly started selling as a commercial tool mainly to experienced penetration testers. Since then, many other penetration testing commercial and open-source tools have been developed and used. (See, for example, "Security Power Tools," by Bryan Burns, Dave Killion, Nicolas Beauchesne, Eric Moret, Julien Sobrier, Michael Lynn, Eric Markham, Chris Iezzoni, Philippe Biondi, Jennifer Stisa Granick, Steve Manzuik, Paul Guersch. O'Reilly Media; 1 edition (Sep. 3, 2007))

The inception of penetration testing frameworks evolved the practice as it allowed the building of automation into the process (see, for example, "CORE IMPACT: Penetration Test Automation," by Iván Arce, 2001; "Automating Penetration Tests—a new challenge for the IS industry?," Iván Arce and Max Caceres in Black Hat Briefings, Las Vegas, Jul. 11-12, 2001; "Automating Penetration Tests," by Iván Arce in Presentation at the SANS I/O Wargames 2001 conference, Sep. 26, 2001; "Attack Planning in the Real World," by Jorge Lucángeli Obes, Carlos Sarraute and Gerardo Richarte, in SecArt'2010 at AAAI 2010, Atlanta, USA, Jul. 12, 2010). In particular, the know-how required from the user/auditors in a penetration test has been lowered, and for the last few years IT professionals with some security knowledge have been able to perform penetration testing services.

A factor contributing to this trend is the fact that government and other regulations started requiring security testing in different organizations. Therefore, the penetration testing practice has become commonplace in security-conscious companies and organizations, and also in companies and organizations subject to security testing regulations.

Penetration Testing as a Service

The present invention generally improves the mobility and granularity with which penetration testing and risk assessment chores can be serviced, while it brings in new opportunities for measuring security and comparing the security posture of those being tested. The present invention allows the provisioning of a service, optimizing how resources are consumed and offered, and charging by usage of resources, where any user can execute arbitrary penetration testing chores (e.g., modules) from any computer when connecting to this server.

Penetration Testing Deployment in an Infrastructure as a Service Platform

FIG. 1 is as schematic diagram illustrating the present system for providing automated computer security compromise as a service. Referring to FIG. 1, one aspect of the present invention involves an elastic penetration testing system that accepts an unbounded number of users (100, 101, 102) that performs security tests against network and web-application attack vectors, and produces security assessment reports and interactive visualizations. Herein, the term elastic is used in the sense that the infrastructure can scale programmatically and on-the-fly.

For exemplary purposes, an instantiation of this invention has been implemented and deployed in Amazon Web Services infrastructure (http://aws.amazon.com). Other instantiations are possible in other Infrastructure as a Service provider including—but not limiting to—Rackspace, Joyent, GoGrid and FlexiScale. Moreover, the present invention can also be implemented in GoogleApp Engine and other platforms as a service infrastructures.

The present system and method is divided into 3 main components and a central database (113): front end (104), penetration testers (106), and report generators (108, 109). At all times there is at least one instance of the front end component deployed and functioning, and there can be more than one instance of every component. The components fulfilling the same functionality work in parallel, for example, through load balancers (in the case of a web application or web service) or using a messaging/queuing system in other cases.

The present system and method can run in a network of computer systems (an example of which is described below for exemplary purposes) or in virtual machines. Herein, whenever the terms "instance", "virtual machine", or "virtual system" are used in the description, it means any of the above.

The present system may be implemented as a computer having a memory, a processor, and one or more input and/or output (I/O) devices (or peripherals) that are communicatively coupled via a local interface. The local interface can be, for example but not limited to, one or more buses or other wired or wireless connections, as is known in the art. The processor is a hardware device for executing software, particularly that stored in the memory. The processor can be any custom made or commercially available processor, a central processing unit (CPU), an auxiliary processor among several processors associated with the computer, a semiconductor based microprocessor (in the form of a microchip or chip set), a macroprocessor, or generally any device for executing software instructions.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor.

The software in the memory may include one or more separate programs, each of which contains an ordered listing of executable instructions for implementing logical functions. As an example, the front end, penetration testers, and report generators may all be modules (components) provided by the memory. It should be noted that the present invention may be provided within a network having one or more virtual or physical network adapters (connections).

Component: Front End, Web Service, and Infrastructure

According to this invention, a front end (104) hosted in a web server is accessible to users (100, 101, 102), either via a web server or a web application. Hereafter we refer to this as the front end component or web front end. This component allows new users to register, and returning users to log in. During registration there is one configuration step that must be fulfilled: the user must specify the assets he will include in future pentests and provide the means to verify that he is the owner of these assets. For example, Certification Authorities have standard procedures for handling this in the case of internet-facing web servers. Also, in the case that the invention restricts to penetration-testing assets in Amazon Web Services, the user can provide with Identity and Access Management (IAM, for short; check http://aws.amazon.com/iam/) credentials that alone allow a user to interact with the Cloud Infrastructure to list his assets and verify that the user owns these assets (i.e., EC2 credentials with "Describe Instances" permissions set to "Allow" for all of the assets).

Once the user has signed in he can access the results of past tests and schedule new ones. When scheduling a new pentest a user must select the assets he wants to test and a time for the test to occur. He may repeat the specification of past tests, he may also add recurrent tests (e.g., provide the scope of a pentest that is repeated with a given frequency). Or he may provide a fresh new specification; this will include:

The IP addresses or IDs of the target instances,
The URIs (Uniform Resource Identifiers, check http://en.wikipedia.org/wiki/URI) for the target web applications,
The parameters that define an automated pentest; for example,
authentication credentials for the different profiles that are associated to each web application included in the test (e.g., username and password),
a list or description of modules and exploits that are or are not going to be launched per IP address This information is stored in the front end as a pentest definition.

In order to implement an instantiation of this invention, one can profit from certain standard services and tools that are sometimes included in the offer of the cloud provider (e.g., Amazon's AWS). These include:
a centralized secure storage service. The storage service allows access-controlled read, list and write capabilities of files to the other components. An example of this is Amazon's S3.
a message-queuing service. The queuing service allows access-controlled queuing and de-queuing of a (first-in-first-out) queue. Examples of these are Amazon's SQS and RabbitMQ.
an identification and access management service. The identification and access management service allows to the owner of assets to be tested to provide the infrastructure with credentials to:
Enumerate the assets (e.g., IP address of a host, operating system of this host).
Assert that the alleged owner of these assets is the real owner. In AWS, the IAM service has this capability. An analogous verification process is used by certification authorities when issuing a digital certificate.
A payment system and method that allows the infrastructure to charge users Once a pentest is scheduled, the infrastructure will prepare a ticket, or tickets, describing the tasks that need to be done to carry this pentest. There exist different processes and methodologies to distribute these tickets including a centralized queue or a web service; both implementations would answer questions, such as, but not limited to:
What's the next testing/report-generation task to be done?
What's the status of task with a given ID?
How many tasks associated to a given pentest remain?
How many penetration testing instances must be used to finish the tasks within a given time?

Figure 4:
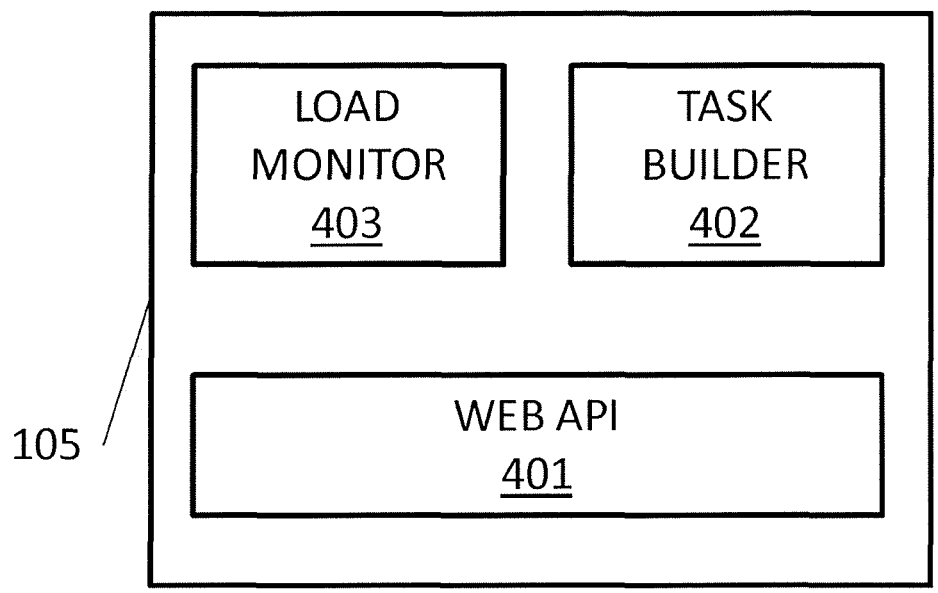
FIG. 4 is a schematic diagram illustrating the main components in a command and control component.
Figure 6:
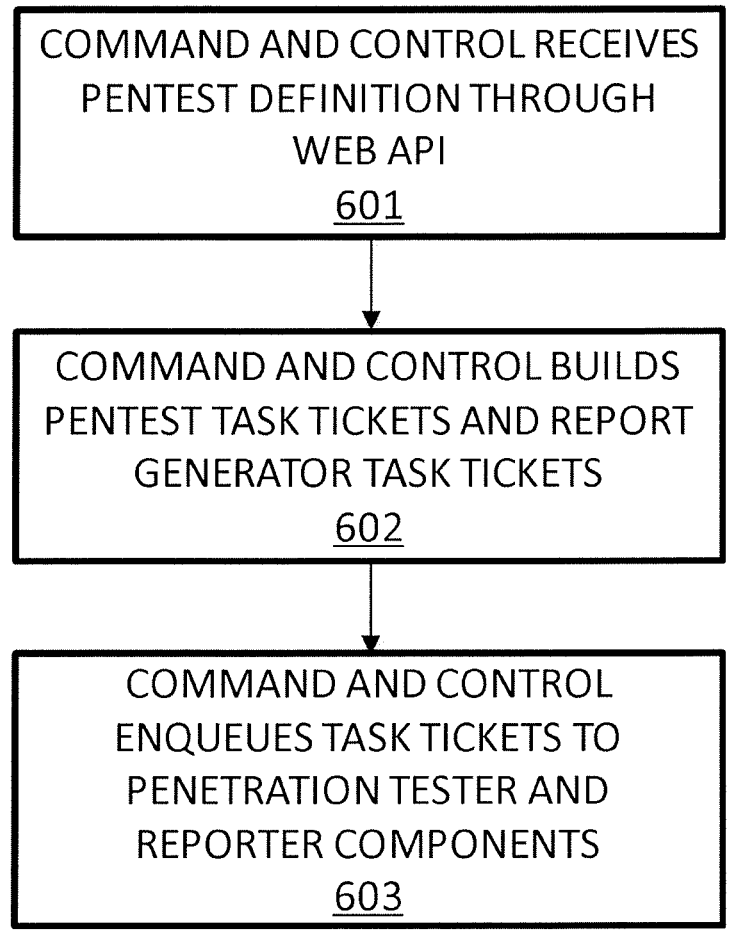
FIG. 6 is a flowchart illustrating functionality performed by the command and control component while processing pentest definitions received through a web API.

One sub-component of the front end component is the command and control component or sub-component (105). FIG. 4 is a schematic diagram illustrating the main components in a command and control component. The present system and method may include intelligence to balance its workload. FIG. 6 is a flowchart illustrating functionality performed by the command and control component while processing pentest definitions received through a web API. Basically, the command and control sub-component uses information from the pentest definitions received (601), e.g., from the front end or from another mechanism via a web API (401), and the present state of the other components in order to manage this workload. The command and control component will include a load monitor (403) which monitors the resources (penetration tester components, report generator components) available, the size of the existing queues (if any). A pentest ticket task builder (402) within the command and control component is responsible for defining pentest task tickets that are assigned to penetration tester components. A pentest task ticket contains all the information required by one penetration tester component to execute portions of a pentest, and in particular, it contains enough information to execute the underlying set of (penetration testing framework) modules. The pentest ticket task builder will create (build) pentest task tickets (602) so that the pentest definition is covered when all the tests associated to these tickets are executed.

For example, if the pentest definition includes two different IP addresses for the target hosts, then these two target hosts can be tested in parallel by two penetration tester components and hence two pentest task tickets will be generated. The two pentest task tickets generated would list one IP address and a definition of the (penetration tester framework) modules that modules that would be used in pentesting the host behind the said IP address. Also if the pentest definition includes the starting and ending time (limits) for the test, then the command and control component may deduce the number of penetration tester components that must be used in parallel to succeed with this test. Additionally, a pentest task ticket that has a specific target host may include some geographical information related to this host and the command and control component will build a pentest task ticket mandating that the penetration tester component that handles this test is in a location close to the former (e.g., if the target system is in Europe, then the testing component will also be in Europe). More generally, the penetration tester will build the pentest task tickets using information available from the pentest definitions that have been generated by users (and remain unfinished pentests), the current load of the system, statistics from past tests (e.g., that specify the time required to execute penetration tester framework modules) and a optimization software. This software may be, but is not limited to, planning software (see, e.g., http://en.wikipedia.org/wiki/Computer_planning).

The present system and method can be configured either to charge users before the pentest is queued or after. In the former case, the charges will depend on the pentest definitions, while in the latter case they may be derived from the resources consumed during the pentests (e.g., CPU time, bandwidth). A payment system should handle this in any case; payment systems are known in the art, one example is Amazon's Flexible Payment System (FPS).

Central Database

A central database (113) is part of the present system and method. It consists in a standard database management system (e.g., MySQL, MS SQL) hosted in a server and which accepts connections and queries from penetration tester components, report generator components and the front end component.

Component: Penetration Testing

Figure 2:
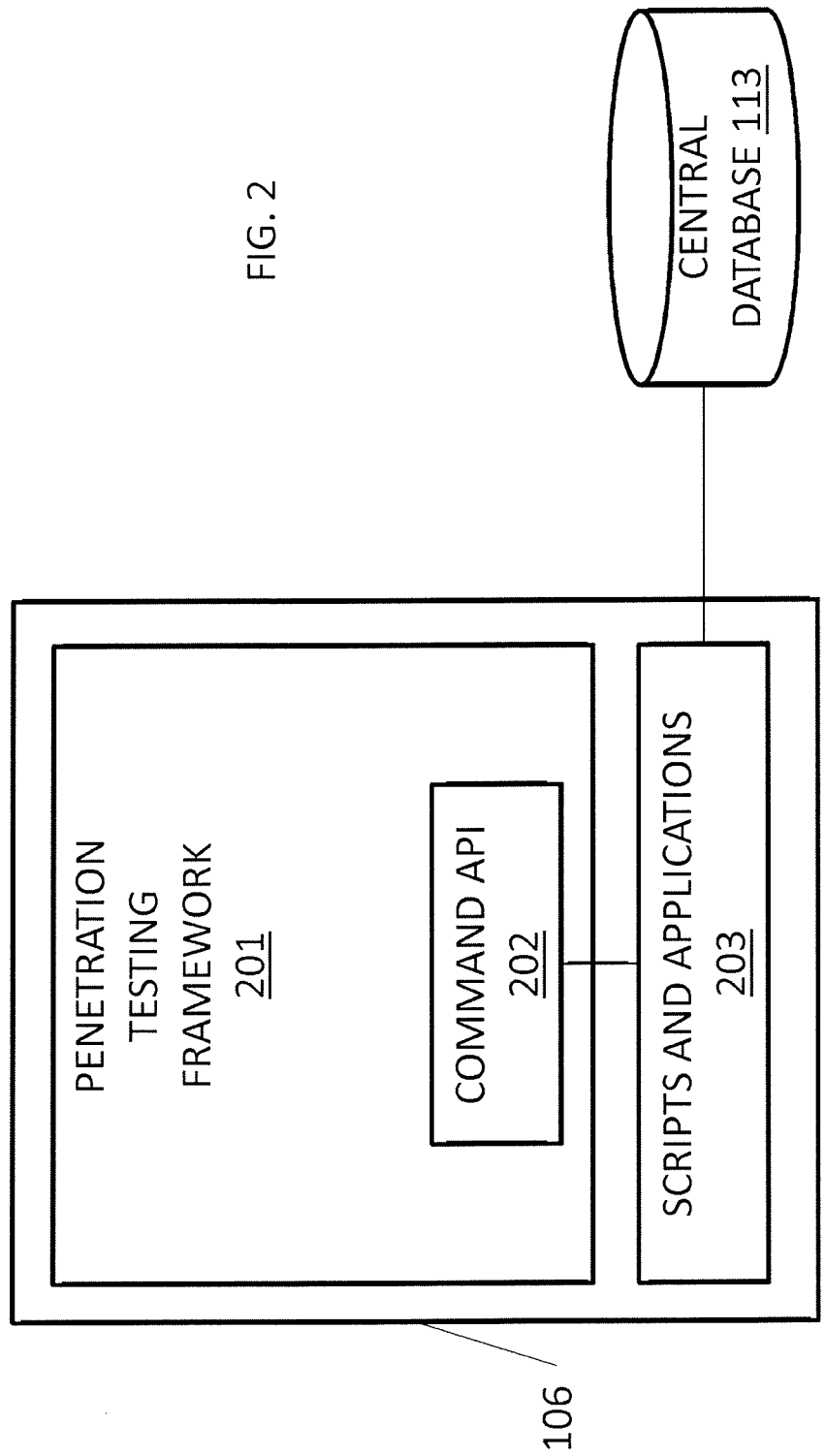
FIG. 2 is a schematic diagram illustrating the main components present in a penetration tester component.

The present system and method contains one or more penetration tester components (106, 107). FIG. 2 is a schematic diagram illustrating the main components present in a penetration tester component. A penetration tester component runs in a server machine which is connected, e.g., through the internet, with the command and control component. These components may be hosted at different physical locations (e.g., to optimize costs and add redundancy to the infrastructure). In the server there is an OS, a penetration testing framework (201) installed on top of the OS and a set of web services, scripts and applications (203). The penetration testing framework was described earlier in the related art section (see also U.S. Pat. Nos. 7,228,566 and 7,757,293, and the US patent applications 20080263671 and 20080256638). In fact, only an application programming interface (API) for issuing commands (e.g., executing penetration tester framework modules) and providing answers is required of this penetration tester framework.

Figure 8:
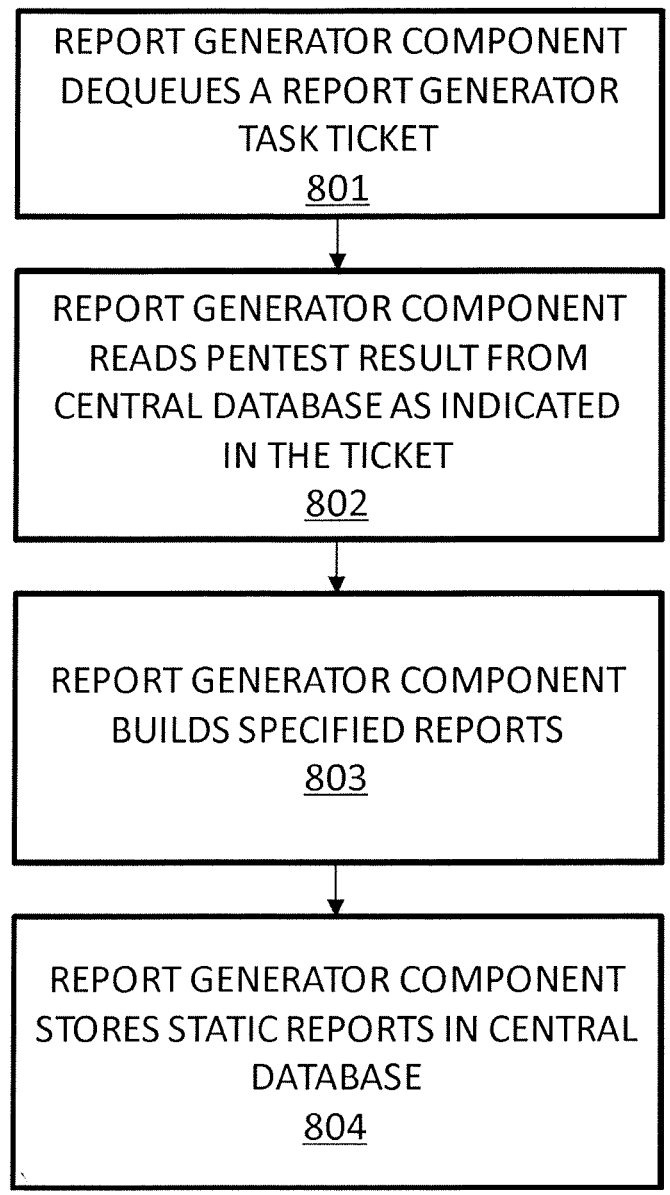
FIG. 8 is a flowchart illustrating functionality performed by a report generator component while dequeuing a report generator task ticket.

FIG. 8 is a flowchart illustrating functionality performed by a report generator component while dequeuing a report generator task ticket. On startup, a script receives a pentest task ticket (701) from the command and control component (603). This startup process may include the exchange of cryptographic keys and processing of encrypted information. The ticket includes the properties and parameters that define are required by the penetration testing framework to execute the underlying modules. This includes, but is not limited to the IP (Internet Protocol) address of the host that is to be targeted in the pentest, or the URI of a web application to be targeted in the pentest. The definition may also include more stringent specifications, for example but not limited to, a set of exploit modules that may be used during the test, modules that must be used during the test, authentication credentials for a web-application test, et cetera. In particular, the ticket may ask the penetration testing service to execute one or more modules against a target machine. More on these specifications can be found in the U.S. Pat. Nos. 7,228,566 and 7,757,293, and the US patent applications 20080263671 and 20080256638.

Before starting the test, the present component validates that a "penetration testing policy" is being followed, e.g., the policy may require that the target system or systems included in the pentest definition are owned by the (alleged) user soliciting the test.

Next, the script will perform an automated penetration test against the host specified in the pentest task ticket by using features available in the pentesting framework. That is, the component will control the pentesting framework and issue commands (702) through the API using parameters available in the pentest task ticket. During the run of the test (703), the system will populate a (local) database within the penetration testing framework with the data pertaining to the actions executed and the answers received. Once the job underlying the pentest task ticket is finished (704), the service will store the log and (local) database generated during the penetration test within the central database of this system and clear all data pertaining to the past test from the penetration testing framework (705). It will also send a message to a special queue (e.g., a report generation queue) informing that the pentest has concluded.

The log may include the list of actions executed by the penetration testing framework during the penetration test. In particular, the exploits and modules that were used, their input and output, the time they were executed and the resources consumed by the host of the penetration testing framework (e.g., the amount of data sent and received through the network, the system calls executed).

Component: Dashboards/Report Generator

Figure 3:
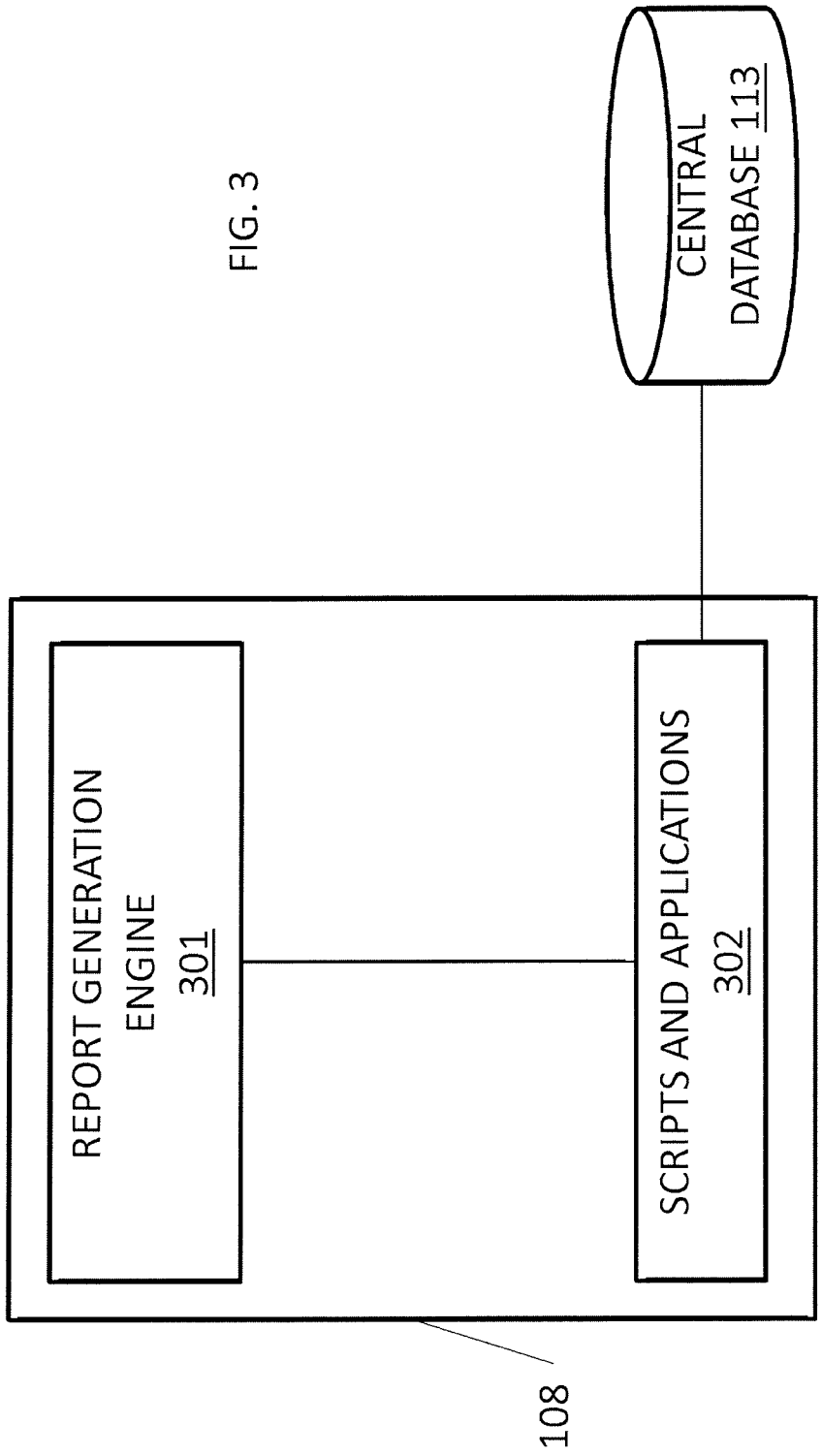
FIG. 3 is a schematic diagram illustrating the main components present in a report generator component.

Static reports and a dynamic visualization can be obtained for each pentest. FIG. 3 is a schematic diagram illustrating the main components present in a report generator component. The dashboard/report generator component (hereafter report generator component (108) runs within a server and contains at least one of visualization software or report generation engine or software (301). The report generator component listens for messages describing what pentest task tickets have been finished.

Figure 9:
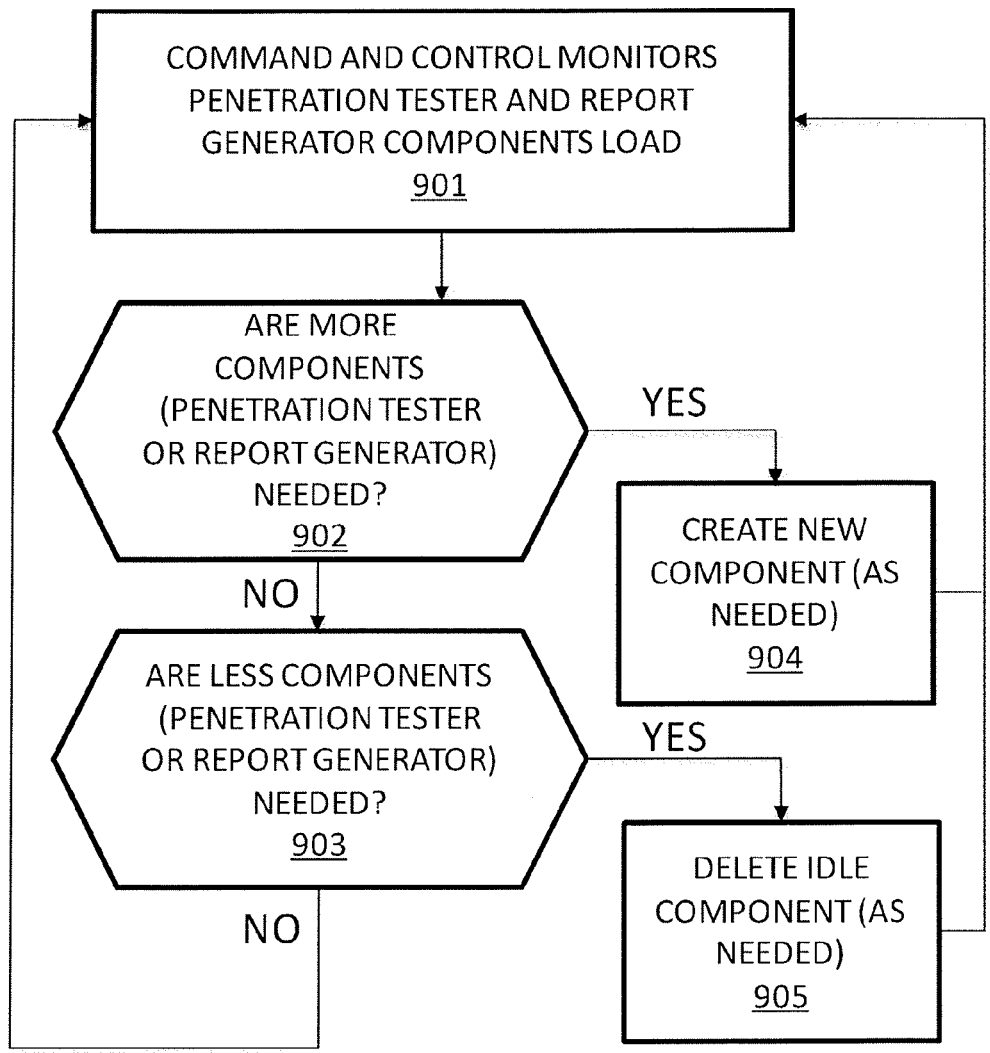
FIG. 9 is a flowchart illustrating functionality performed by the command and control component while monitoring and scaling the system infrastructure.

FIG. 9 is a flowchart illustrating functionality performed by the command and control component while monitoring and scaling the system infrastructure. Once a report generator task ticket is received (801), the report generator component will assess if all the pentest task tickets required to generate the underlying report have been finished (e.g., if the report generator task ticket establishes that the report should include the result of pentesting five different IP addresses, then the report generator component will check if the messages it has received confirm that the pentests against the five IP addresses have finished). If this happens, then the report generator component can start generating the report or reports. In particular, report generator task ticket will describe the type of reports to be generated associated to that penetration test.

A script will query the central database to access the replicas of the (local) databases for the different pentest task tickets underlying the pentest report generator task ticket and assemble a single database describing the complete pentest (802). Next, the report generator engine (301) will produce the reports (804). For example, static reporting can be implemented following the static reporting of Impact Professional v11 (see http://www.coresecurity.com/).

On the other hand, interactive visualizations and dashboards can also be used. In this case, a script within the report generator component queries the central database to access the (central) database replicas as soon as the underlying messages arrive and produces a visualization with this partial information. Once all the necessary messages have been received and all the local database replicas are stored in the central database, the report generator component can complete the visualization. Meanwhile, the dashboard will illustrate what is the pentests that have been finished and the results for these. On one implementation, a dashboard lists all the hosts for this user, it includes, for each a graph describing amount of vulnerabilities over time for each host, and other statistical parameters. A user may select any point in the curve and recover the report associated to the underlying pentest. Similarly, if the user points to a specific vulnerability, the solution will answer with a list of the tests (and systems) in which that vulnerability was discovered.

A run of the system that runs in EC2 and targets infrastructures deployed in EC2

Users interface with the invention from a web browser that connects to a specific URI within the internet (e.g., http://www.CoreCloudInspect.com/). The front end component (104) handles the answers.

Figure 5:
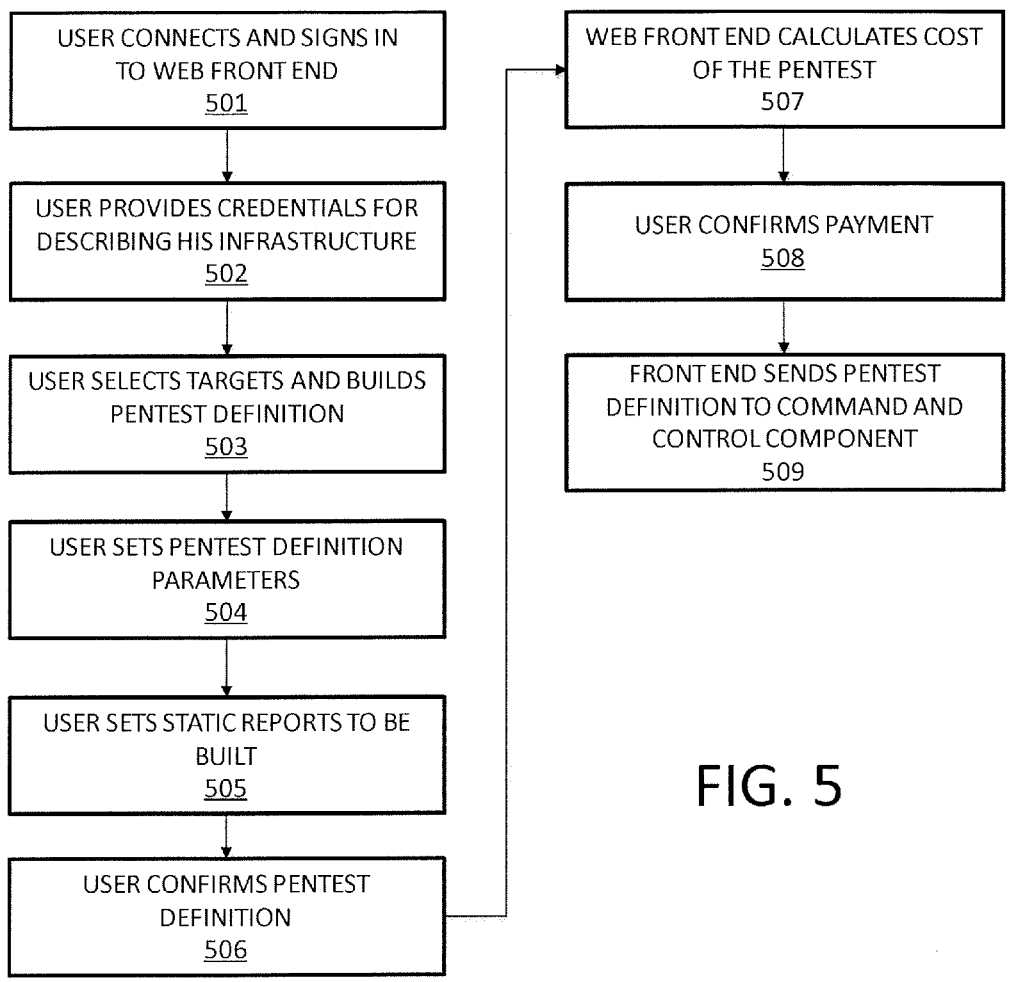
FIG. 5 is a flowchart illustrating functionality performed by the user through a web front end.

FIG. 5 is a flowchart illustrating functionality performed by the user through a web front end. A user signs in (501). In order to do this, he provides a username, provides authentication credentials (e.g., a password) and a pair of IAM credentials that allow their holder to describe the machine instances associated to the EC2 account of this user (502).

Figure 10:
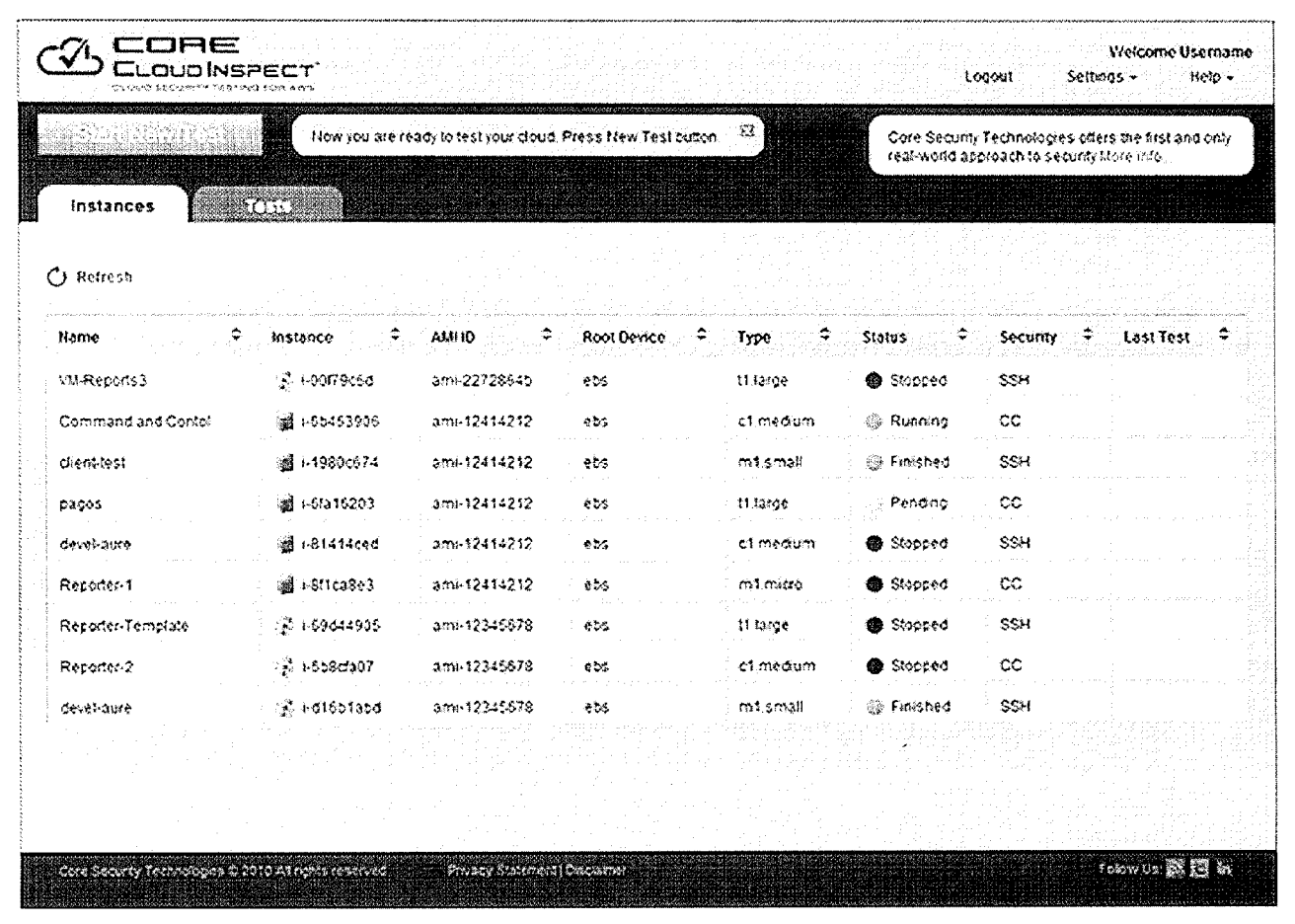

At any time a user with an existing account can register. When this happens, the front end component retrieves the IAM credentials associated to this user from an internal database and queries EC2's API to obtain instantaneous information of the machine instances associated to the EC2 account including but not limited to: IDs, size, operating system, EC2 status (started, stopped, etc.). This is shown in FIG. 10.

The present invention also retrieves pointers to the (central) database replicas within the central database underlying past pentests associated to this user. The user will next be shown a dashboard that includes information about the instances in the EC2 account (e.g., ID, size, status, operating system), the past tests that affected these, security metrics associated to these. Examples of metrics include, but are not limited to, number of unique vulnerabilities discovered over time, estimates for time to patch, percentage of vulnerable machines under this EC2 account, ratio of percentage of vulnerable machines under this account to percentage of vulnerable machines for other EC2 accounts that share a certain property (e.g., EC2 accounts for companies in the same vertical sector, same quantity of machine instances, similar OS distribution), evolution of the security stance (e.g., compare the metrics for one month against the average value for the same metric on the last 12 months). In order to display and compute these metrics, the system will access a database that stores the result of past pentests by this user and a global database. The report generator component will generate these reports, which will be provided to the front end component.

Figure 11:
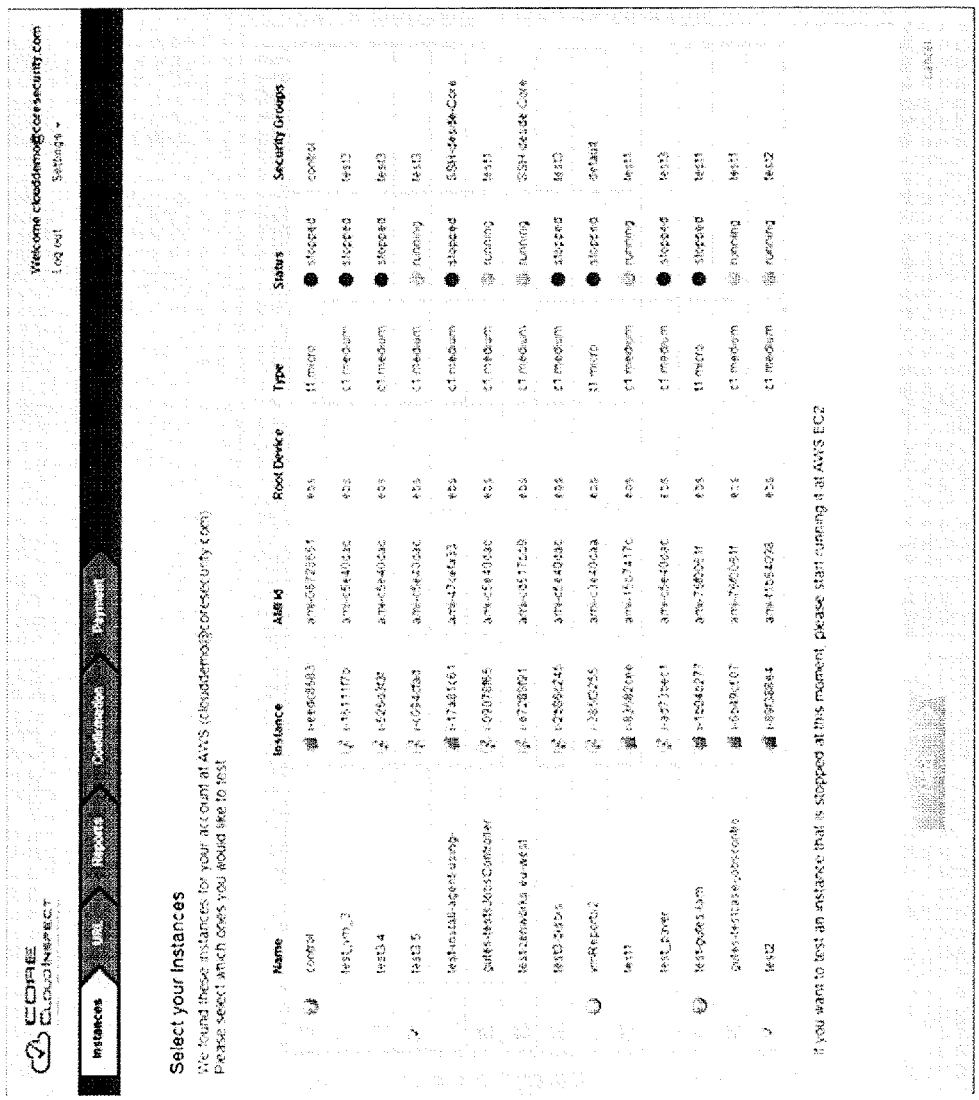
FIG. 11 is a screenshot illustrating the first step of the "new pentest" wizard, where the pentest definition is built inside the web front end.
Figure 12:
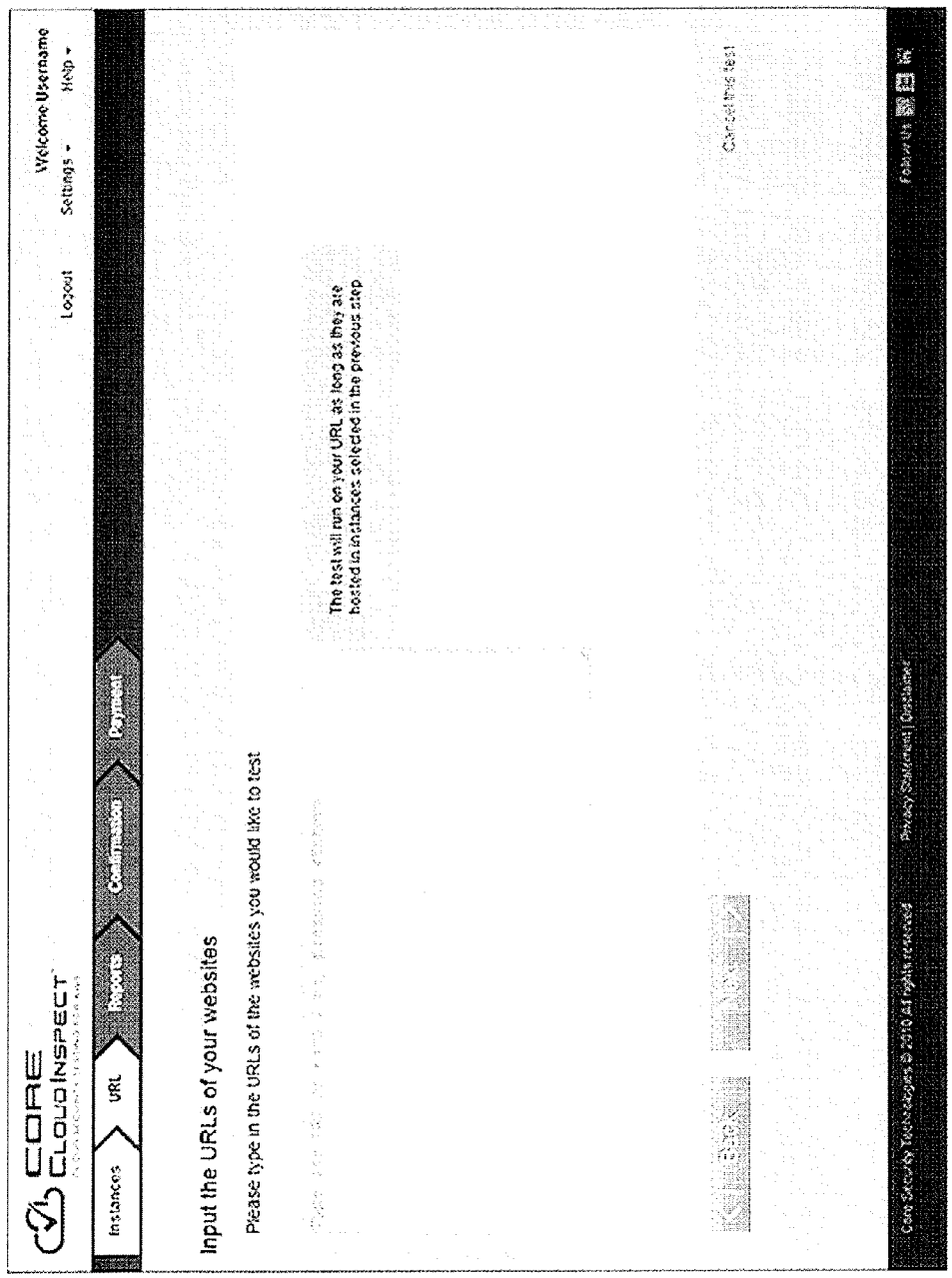
FIG. 12 is a screenshot illustrating the second step of the "new pentest" wizard where the user can select target web applications to be attacked.
Figure 13:
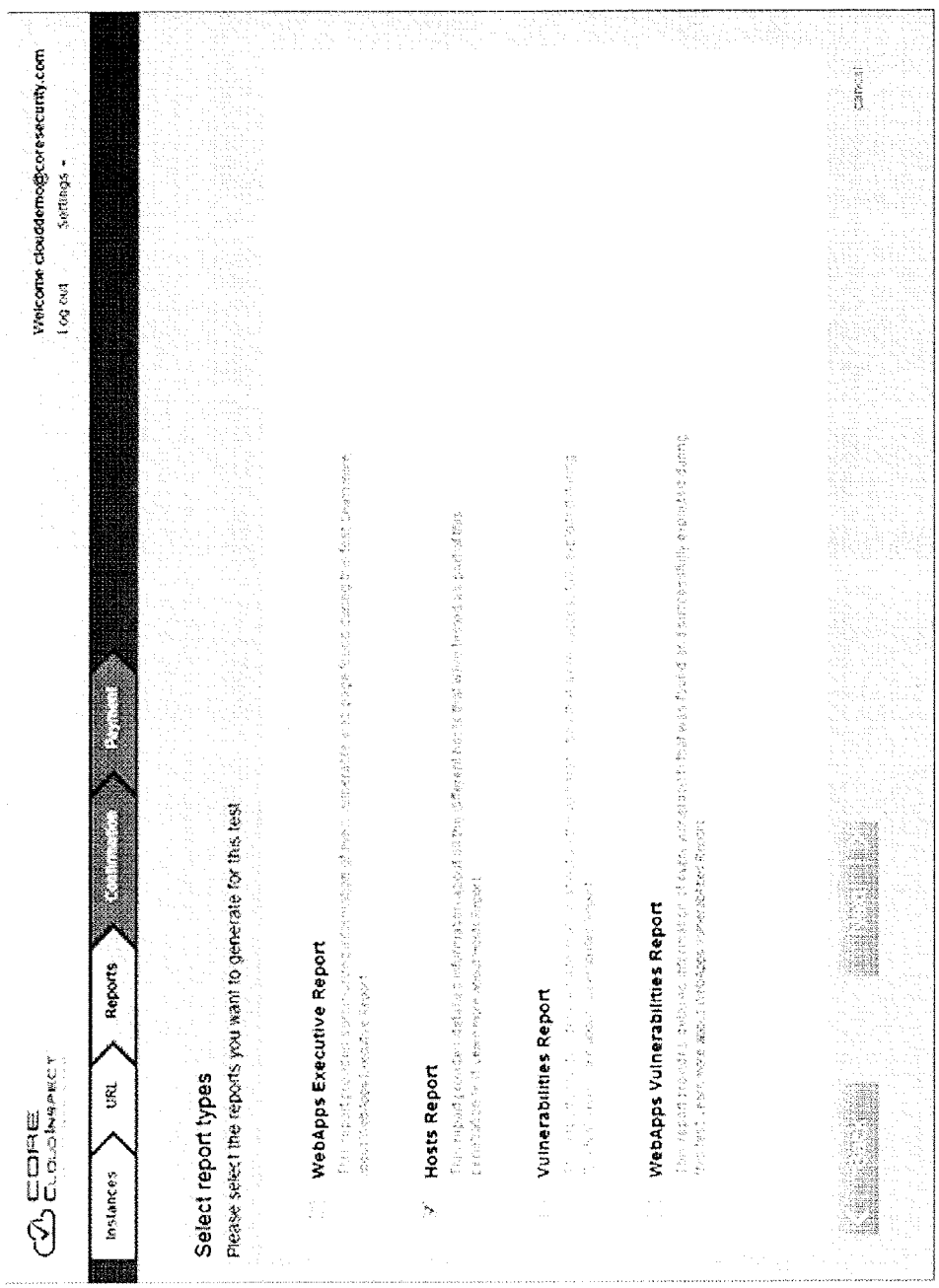
FIG. 13 is a screenshot illustrating the third step of the "new pentest" wizard where the user can select which static reports must be generated by the report generator components.
Figure 14:
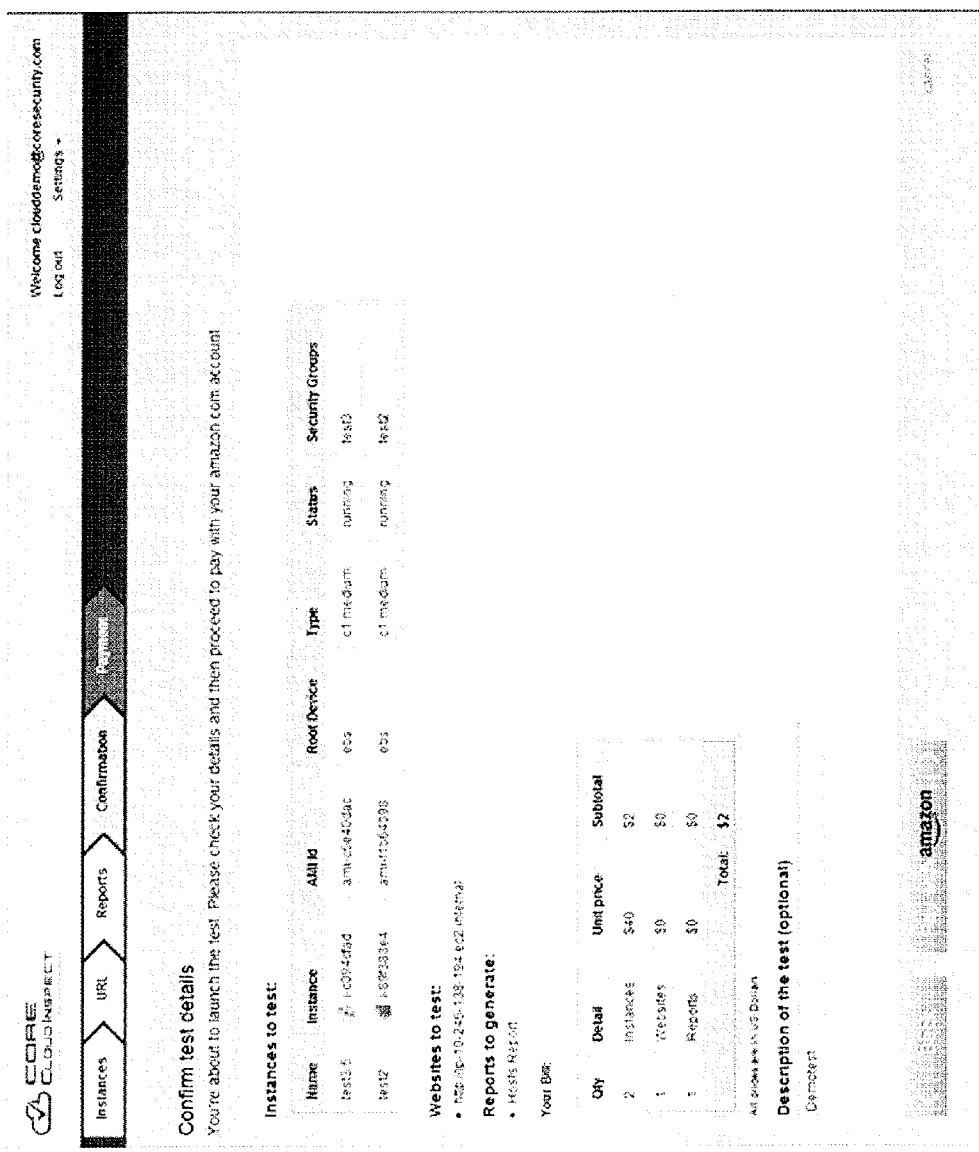
FIG. 14 is a screenshot illustrating the last step of the "new pentest" wizard where the user confirms the pentest definition, has the pentest definition quotation and proceeds to payment.

The (front end component) dashboard (FIG. 10) includes a "Start New Test" button. When the user chooses to start a new pentest, he will follow a wizard that will guide him through the different options. Using the wizard, the user will build the pentest definition; that is, he will choose the machine instances to be tested for network vulnerabilities (FIG. 11) and the web applications to be tested for web application vulnerabilities (FIG. 12). He will also select the sub-type of test; for example, in the case of a network test, this can include a specific exploit, or the parameters for an automated selection of all the exploits targeting vulnerabilities that underlie the specific machine configuration (e.g., operating system and open ports), the depth of the attack (e.g., it the attack includes pivoting and how deeply); in the case of a web application test, this may include the login credentials for different user profiles, a white list and black list for pages to be visited and not-visited. Next, he will choose the reports he wants to be generated relying the results of this test (FIG. 12). And, finally he will be shown a summary of the details he specified and the price for the service (FIG. 13).

Once the user confirms this and the front end is able to interact with Amazon's Flexible Payment Systems and execute the payment the solution starts to execute the test. Internally, the front end component will rely the pentest definition to the command and control sub-component (601). Next, the command and control component will issue pentest task tickets and report generator task tickets (603) with different tasks, according to a pre-specified granularity. For example:

One pentest task ticket per machine instance to be examined and one per web application to be examined; each ticket containing the scope and details underlying this target.

One pentest task ticket specifying a specific (penetration tester framework) module that may be used against many targets.

Different pentest task tickets may be used to execute certain modules in parallel; for example, the front end issues a ticket for a penetration testing component to crawl (or spider) a web application and then this component, subdivides the job of penetration testing the pages found in two or more equally-sized portions.

Report generator task tickets are used to define the reports that the user has required.

These tickets will be queued in a pentesting queue and a report generator queue (implemented as two queues in Amazon's Simple Queue Service, or SQS). Additionally a finished pentest queue is also used.

One or more penetration testing components run in parallel in EC2 (possibly at different zones (106), (107)). Each periodically polls the pentesting queue for a new pentest task ticket (701). If the queue is nonempty, they retrieve the first ticket and start the penetration testing job. Code within the component will parse the pentesting job task ticket and start the pentest. To do this, it will "call" the penetration testing framework's API and execute specific modules according to the information in the pentest task ticket (702). For example, the pentest task ticket may include the URI of a web-application hosted on an instance in EC2, the ID of this instance and the key-ID & key pair required to describe this instance;

it may also include login credentials for the web application and other details defining the web-application pentest. The penetration testing framework running within the pentester component can process this API call (703); that is, it will execute the said pentest and store the database and log locally. Once the API answers that all the modules have been executed (704), a script running within this component will notice that the pentest has finished and next perform the following steps (705): i) securely transfer a dump of the database into a permanent storage service (in a specific bucket within S3 that is of restricted access); ii) inform that the pentest has ended by posting a ticket in the finished tests queue which specifies the ID of the pentest that has concluded and a pointer to the database dump; iii) run a clean-up script that clears the databases within the penetration tester component and resets all the pentest information within this component. At this point, the component again polls the pentesting queue for a new job.

Figure 7:
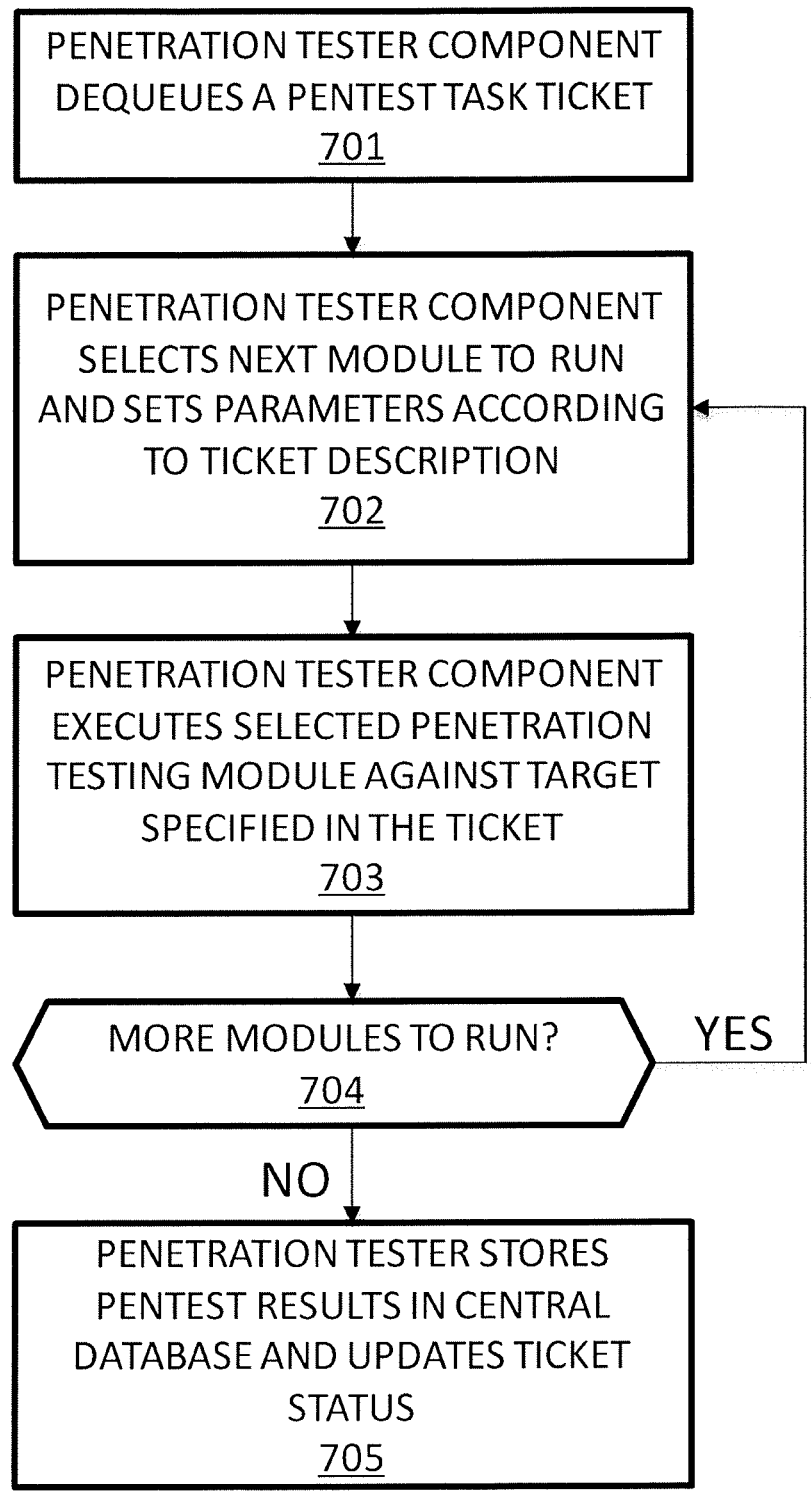
FIG. 7 is a flowchart illustrating functionality performed by a penetration tester component while dequeuing a pentest task ticket.

A load monitor (403), running within the command and control subcomponent, periodically monitors the size of the pentesting queue. FIG. 7 is a flowchart illustrating functionality performed by a penetration tester component while dequeuing a pentest task ticket. If necessary (902), it controls the number of pentesting components that run in each zone by turning new ones on or stopping others (e.g., if the estimated end time for the queue is over 12 hours, more pentesting components are added). Similarly, the load monitor monitors the size of the report generator queue and controls the number of report generator components. Necessity will depend in the size of the queue and the availability within the specific AWS zones.

One or more report generator components run in parallel in EC2 (possibly at different zones 108, 109). Each periodically polls the report generator queue for a new report generator task ticket. If the queue is nonempty, it retrieves the first ticket and starts generating a report. It will then check the finished tests queue to see if all the required tests have been finished. A report generator task ticket will include an identification number for the pentest, pointers to the databases and logs generated by the penetration testing component for all the jobs within the ID, and parameters that define the type of report required (e.g., a PCI compliance report, a FISMA report, a vulnerability report). Code within the component will retrieve the databases for the different pentesting jobs and combine them. Next, it will generate reports, such as, but not limited to, PDF reports, for the type of reports selected. These reports will be then stored in a specific restricted-access bucket of the S3 service, and provide the front end with pointers to these reports. Finally, the front end will provide the said pointers to the user so he can download them and view them.

We claim:

1. A system for providing automated computer security compromise as a service, running within a cloud computing environment, the system comprising:

a web server having a web front end running on the web server, wherein users connect to the web server via the web front end, and wherein the web server has stored therein pentest definitions created by the users through use of the web front end;

wherein the web server further comprises a computer-based command and control component which processes the pentest definitions, builds pentest task tickets and reporting task tickets, and monitors different portions of the system, wherein the portions of the system are selected from the group consisting of at least one computer-based penetration tester component and at least one computer-based report generator component, wherein the command and control component interacts with the cloud computing environment to scale up or down the number of penetration tester components and the number of report generator components, and assigns the task tickets to the penetration tester components and to the report generator components, at least one of the computer-based penetration tester components runs a penetration testing framework, the penetration tester component being configured to run penetration testing modules available inside the penetration testing framework as instructed by the pentest task tickets built by the command and control component;

at least one of the computer-based report generator components generates reports based on the reporting tasks tickets built by the command and control service; and a central database including memory for storing pentest results wherein results are isolated by the central database for each front end user.

2. The system of claim 1, wherein the results of the penetration testing framework are stored in the central database.

3. The system of claim 1, wherein the report generator component generates reports based on the reporting task tickets and the pentest results stored in the central database.

4. The system of claim 1 wherein the pentest definitions include machines and web applications owned by the user to be attacked and parameters defining a pentest.

5. The system of claim 4 wherein the parameters include but are not limited to mandatory modules to be executed or avoided by the penetration tester components, timeframes and dates where the pentest should be executed, how the pentest should be repeated over time and default credentials to log into web applications to be attacked.

6. The system of claim 1 wherein the web front end sends the pentest definitions to the command and control component.

7. The system of claim 6 wherein the web front end allows the user to review past penetration tests and reports by selecting a specific machine or web application inside an infrastructure of the user.

8. The system of claim 1, wherein the computer-based command and control component, the computer-based penetration tester component and the computer-based reporter generator component are implemented using a computer-based processor for executing software stored in computer-based memory.

9. The system of claim 8 implemented as a computer having the computer-based memory, the computer-based processor and one or more input and/or output devices or peripherals that are communicatively coupled via a local interface.

10. The system of claim 1, wherein the computer-based command and control component is a module that includes a load monitor, a task builder and a web API, wherein the load monitor periodically monitors a size of a pentesting queue, and wherein the task builder is configured to define pentest task tickets that are assigned to the penetration tester components.

11. A method for providing automated security compromise as a service, the method comprising:

interacting with a user to define and assess assets the user can test;

creating a pentest definition by selecting a set of target computers and web applications from a web front end and setting up parameters for a pentest;

submitting the pentest definition to a command and control service which defines pentest and reporting task tickets, wherein the pentest and reporting task tickets include penetration testing modules to run, the parameters required by the modules and in particular a target of the penetration testing module;

monitoring a status of a system's components and scaling up or down penetration testing instances and reporting instances with a computer-based command and control component;

each penetration testing instance executing the modules detailed in one of the pentest tickets and according to the parameters included in the pentest tickets;

each reporting instance executing reporting tasks detailed in one of the reporting task tickets and according to the parameters included in the reporting task tickets;

defining a ticket as closed once a reporting or penetration testing instance finishes running underlying penetration testing or reporting modules.

12. The method of claim 11 wherein the pentest definition parameters include but are not limited to mandatory modules to be executed or avoided by the penetration testing service instances, timeframes and dates where the pentest should be executed, how the pentest should be repeated over time and default credentials to log into web applications to be attacked.

13. The method of claim 11 wherein the pentest tasks contain a list of penetration testing modules present in a penetration testing framework running in each penetration testing service instance to be executed.

14. The method of claim 13 wherein the penetration testing service instances execute pentest tasks and store the results of the execution in a central database.

15. The method of claim 14 wherein the reporting instances generate reports specified in the reporting tasks by reading the results of the executed pentest tasks stored in the central database.

16. The method of claim 11 wherein the user visualizes results of the pentest definition by opening produced reports.

17. The method of claim 11 wherein the user compares different penetration tests performed over time by browsing history data stored in a central database.

* * * * *